(12) United States Patent  
Souluer

(10) Patent No.: US 7,155,349 B1
(45) Date of Patent: Dec. 26, 2006

(54) REMOTE LIQUID LEVEL GAUGE FOR REMOTE SENSING, SYSTEM FOR EMPLOYING THE GAUGE AND METHOD OF USE

(75) Inventor: Farid Souluer, Chester Springs, PA (US)

(73) Assignee: American Wireless Gauge, West Chester, PA (US)

( * ) Notice: Subject to any disclaimer, the term of this patent is extended or adjusted under 35 U.S.C. 154(b) by 329 days.

(21) Appl. No.: 10/628,548

(22) Filed: Jul. 28, 2003

(51) Int. Cl.
*G01F 23/00* (2006.01)

(52) U.S. Cl. ....................................... 702/55
(58) Field of Classification Search ................. 702/45, 702/50, 55, 100, 182, 188, 189; 73/290 R, 73/305, 313, 314, 317
See application file for complete search history.

(56) References Cited

U.S. PATENT DOCUMENTS

| | | |
|---|---|---|
| 5,708,424 A | 1/1998 | Orlando et al. |
| 6,437,697 B1 | 8/2002 | Caro |
| 6,564,632 B1 * | 5/2003 | Ross, Jr. ....................... 73/317 |
| 6,715,514 B1 * | 4/2004 | Parker et al. ................... 141/1 |
| 2001/0045892 A1 * | 11/2001 | Thomas et al. ............. 340/539 |
| 2002/0088278 A1 | 7/2002 | Ross, Jr. |
| 2002/0154017 A1 * | 10/2002 | Farner ......................... 340/612 |
| 2003/0084720 A1 | 5/2003 | Ross, Jr. |

* cited by examiner

*Primary Examiner*—Michael Nghiem
(74) *Attorney, Agent, or Firm*—John F. A. Earley, III; Frank J. Bonini, Jr.; Harding, Earley, Follmer & Frailey

(57) ABSTRACT

A system, method and apparatus for improving the logistical inefficiencies associated with the delivery of liquid petroleum gas or fuel oil to remotely dispersed locations, including a gauge for detecting the level of fluid or liquid in a tank, and a transmission mechanism for transmitting the level detected by the gauge to a remote location for further evaluation and processing to facilitate delivery of the fuel.

1 Claim, 3 Drawing Sheets

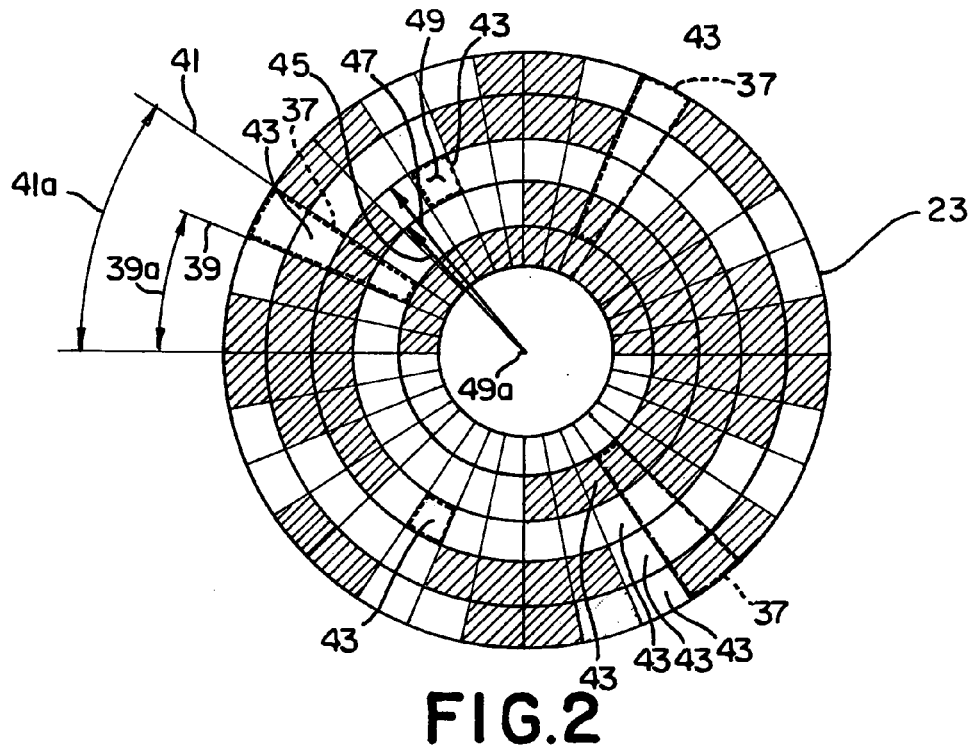
FIG. 2
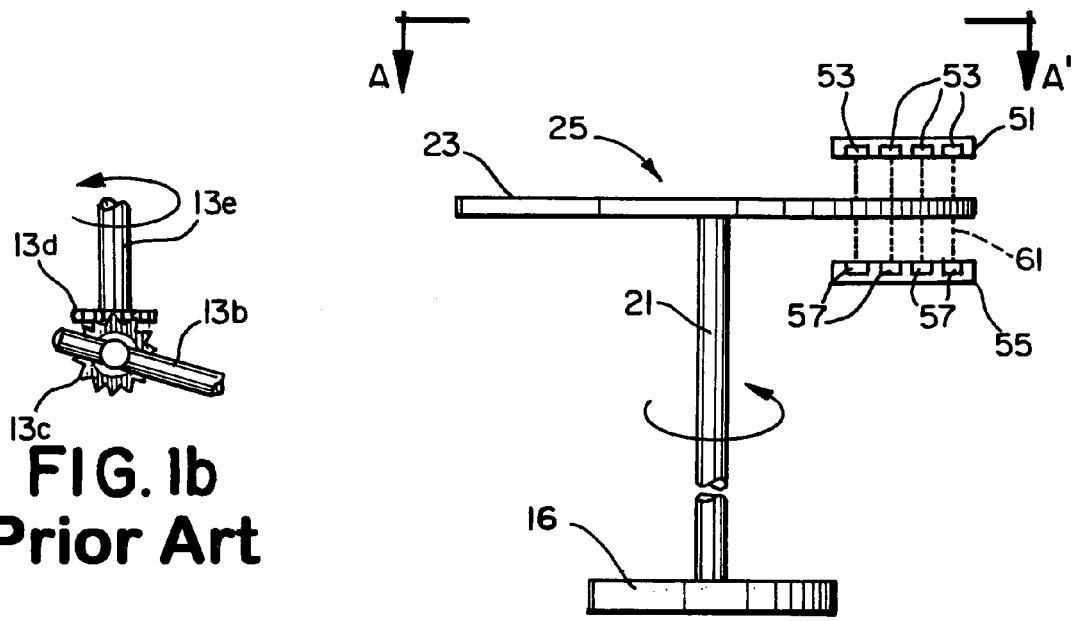
FIG. 1b
Prior Art
FIG. 3

REMOTE LIQUID LEVEL GAUGE FOR REMOTE SENSING, SYSTEM FOR EMPLOYING THE GAUGE AND METHOD OF USE

BACKGROUND OF THE INVENTION

1. Field of the Invention

The present invention relates to gauge technology, in particular to devices, systems and methods for providing remote gauge signals, transmitting remote gauge signals, interpreting remote gauge signals, outputting remote gauge signals, and ultimately managing the logistics associated with servicing remotely located tanks.

2. Brief Description of the Prior Art

Liquid level gauges are frequently employed to monitor the level in a liquefied petroleum gas (LPG) tank or heating oil tanks. Fuel distributors, with or without the assistance of the tank owners, often utilize these gauges to determine when replenishment of the liquid petroleum gas or heating oil within the tank is warranted. Typically, the fuel distributor will send out refueling trucks on a predetermined route to manually monitor the level of tanks by viewing the gauges. Alternatively, the tank owner will monitor the liquid level of the tank, and when replenishment is needed, will contact the distributor to order fuel. If the liquid level in the tank was at or below 30 percent full, the tank would be refueled. If the liquid level in the tank was greater than 50 percent full, the tank would not be refueled, and the distributor would return and monitor the liquid level in the tank at a later time. To avoid explosion, the distributor usually keeps the liquid level below 85 percent full. If the fuel level in the tank is below 20 percent, damage can occur to appliances. Under this regime of manually monitoring tanks, many inherent inefficiencies exist. More personnel are required to monitor and/or deliver fuel within a region. They often span the region several times responding to unorganized fueling orders. These inefficiencies result in increased costs associated with fuel distribution. Accordingly, it would be desirable to minimize operational costs by maximizing the number of fuel deliveries to a number of tank sites at a given period and, during the same time, minimizing the number of repeat routes which traverse the same region.

Gauges that provide an electrical signal in response to the liquid level of the tank are known in the art. For example, U.S. Pat. No. 6,564,632 B2, U.S. Patent Application Publication No. 2003/0084720, and U.S. Patent Application Publication No. 2002/0088278 A1, disclose magnetic liquid level gauges suitable for liquid petroleum gas, including a magnetically driven dial assembly coupled with a wiper arm type variable resistor. The references also disclose magnetically driven gauges that produce an electrical output signal using a shaped sensing magnet coupled with the tank magnet and a hall effect sensor. However, the gauges discussed in the prior art do not resolve the inefficiency issues associated with distributing fuel to remote tank locations. Accordingly, it is desirable to employ a system that is capable of improving the logistical efficiencies associated with the delivery of liquid petroleum gas or fuel oil to a number of remotely dispersed tanks over a geographic area. U.S. Pat. No. 5,708,424, U.S. Pat. No. 6,437,697 B1, and U.S. Patent Application Publication No. U.S. 2001/0045892 A1 disclose wireless liquid level gauges and systems related thereto. However, the teachings discussed in the prior art do not resolve the inefficiency issues addressed above in the manner addressed in the present invention.

SUMMARY OF THE INVENTION

This invention relates to improving the logistical inefficiencies associated with the delivery of liquid petroleum gas or fuel oil to a number of remotely dispersed tanks over a geographic area.

This invention provides an improved apparatus and method of use for improving the logistical efficiencies associated with the delivery of liquid petroleum gas or fuel oil to a number of remotely dispersed tanks over a geographic area.

BRIEF DESCRIPTION OF THE DRAWINGS

FIG. 1b is an enlarged front elevation view of the conventional float mechanism.

FIG. 2 is a top plan view of an embodiment of an encoder pad.

FIG. 3 is a front sectional view of an embodiment of the optical sensors.

DETAILED DESCRIPTION OF SEVERAL EMBODIMENTS

A preferred embodiment of the invention is shown in the following illustrated example, and is not intended to be limiting.

Figure 1:
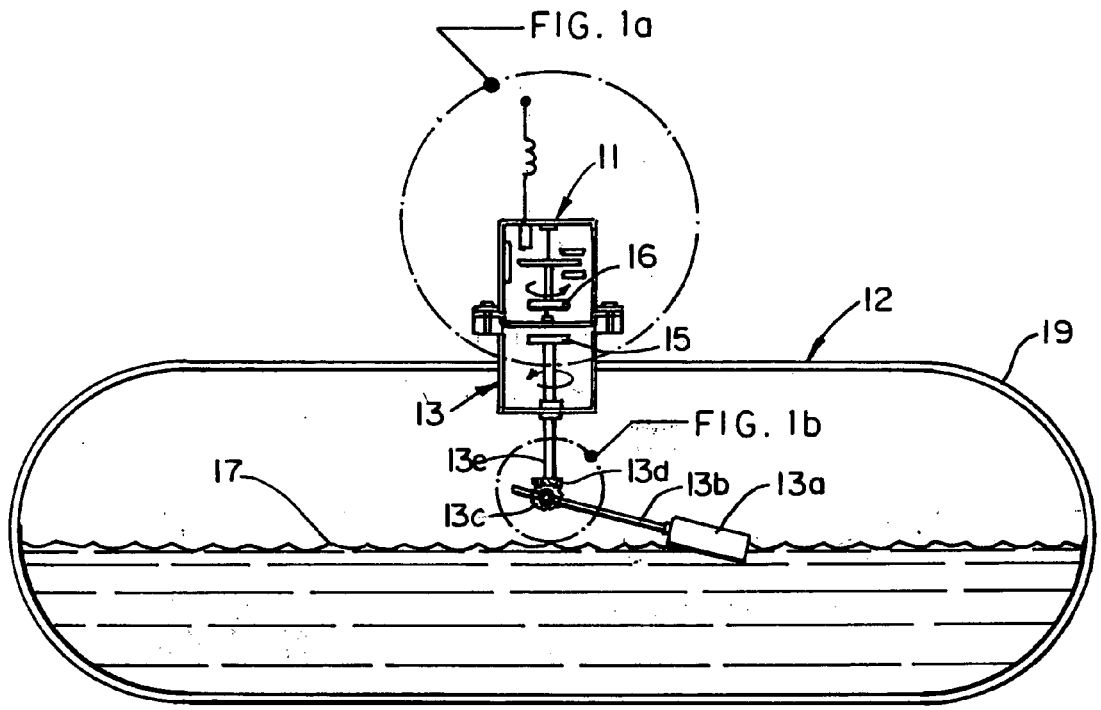
FIG. 1 is a cross-sectional view of a tank exhibiting a conventional float mechanism with a gauge attached thereto.
Figure 1A:
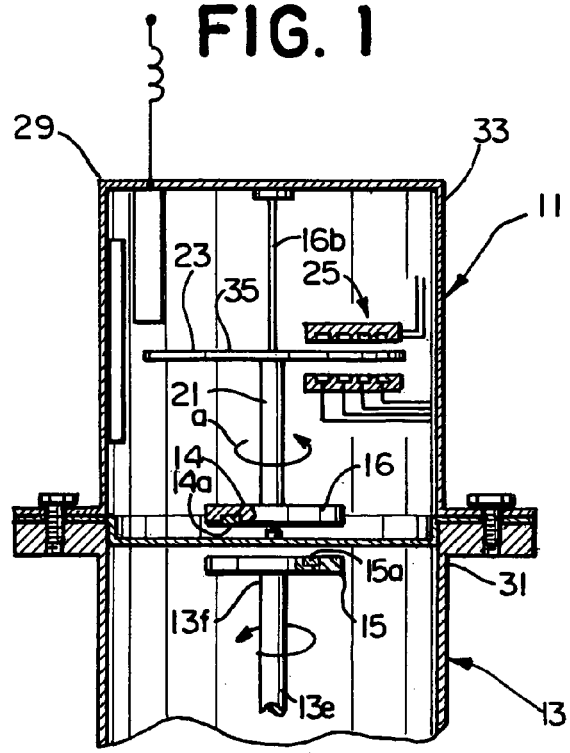
FIG. 1a is a cross-sectional view of the gauge and the conventional float mechanism of the tank.

Turning now to the drawings, there is shown in FIGS. 1, 1a, and 1b a completely digital gauge 11 for measuring the liquid level in a tank 12 configured in accordance with the invention. The gauge 11 is adapted to receive the conventional float mechanism 13 of a tank 19. The conventional float mechanism 13 generally comprises a float 13a fixably attached to a first end of a float arm 13b. A second end of the float arm 13b is attached to an arm pinion gear 13c. The arm pinion gear 13c meshes with a shaft pinion gear end 13d of a magnet shaft 13e to translate rotational motion. The magnet shaft 13e has a tank magnet end 13f with a tank magnet 15 attached thereto. In operation the float 13a is supported by the liquid level 17, and, for example, may float on or near the top of the liquid level 17. As the liquid level 17 changes, the position of the float 13a and the float arm 13b changes. This change in position of the float arm 13b rotates the arm pinion gear 13c and shaft pinion gear 13d, and causes the magnet shaft 13e to rotate in relation to the liquid level 17. The tank magnet 15, being attached to the magnet shaft 13e, rotates with the magnet shaft 13e.

The gauge 11 comprises a rotatable sensing disc 16 having a sensing magnet 14 carried by the sensing disc 16 for magnetically coupling with a tank magnet 15. As the tank magnet 15 rotates relative to the liquid level 17 in a tank 19, the sensing disc 16 is caused to rotate by the sensing magnet 14 responding to the magnetic field of the tank magnet 15. The polarity of the sensing magnet 14 and tank magnet 15 are provided as respective opposite facing poles, so (there is an attraction between the sensing magnet face 14a and the tank magnet face 15a. The sensing disc 16 is connected to an optical rotary position encoder 21 and is mounted for rotation on a shaft 16b. The optical rotary position encoder 21, has an encoder pad 23 which is rotatably mounted for movement with the sensing disc 16. The optical rotary position encoder 21 has at least one optical sensor 25 which generates at least one gauge signal 27 (FIG. 4) responsive to the position of the encoder pad 23.

Preferably, the gauge 11 further comprises an enclosure 29 illustrated having a base 31 and a housing 33 for housing the sensing disc 16 and the optical rotary position encoder 21. The tank magnet 15 rotates as the liquid level 17 within the tank 19 changes. The sensing disc 16 containing the sensing magnet 14 is positioned proximate to the tank magnet 15 within the range of the magnetic field of the tank magnet 15. The sensing disc 16 containing the sensing magnet 14 is rotated in response to the rotation of the tank magnet 15. The rotatable sensing disc 16 is connected to the optical rotary position encoder 21 to rotate the encoder pad 23 therewith.

Referring now to FIG. 2, the encoder pad 23 is illustrated having a face 35. The face 35 has a plurality of encoder arrays 37 arranged according to the polar coordinate system with the origin being the axis 49a, and the radius 49b being 0°. Each encoder array 37 being defined by a first angular position 39 at a first angle 39a and a second angular position 41 at a second angle 41a, the encoder array 37 occupying the space between the first angle 39a and the second angle 41a. Each encoder array 37 preferably is shown contains a plurality of cells 43. The cells 43 are further defined within the encoder array 37 by a first radial length 45 and a second radial length 47. Each cell 43 has a radial midpoint 49, defined as the radial point between the first radial length 45 and the second radial length 47.

Figure 3A:
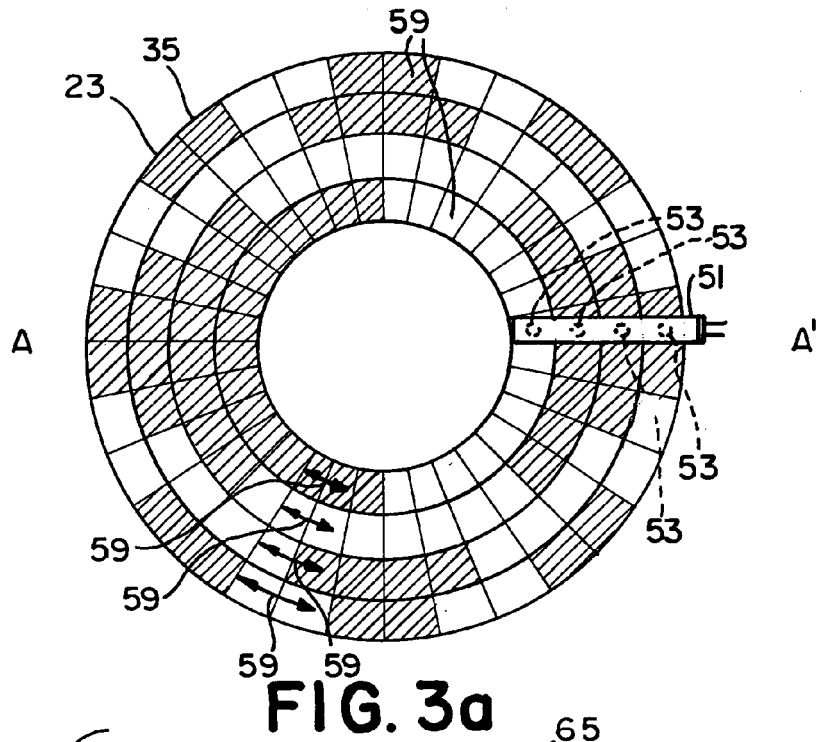
FIG. 3a is a top plan view showing separately the optical sensors and the encoder pad.

Turning to FIGS. 3 and 3a, the optical sensor 25 comprises an array of photoemitters 51 including four single beam emitters 53 and an array 55 of photodiodes 57 including four single beam photodiodes 57. Each of the single beam photoemitters 53 has a designated cell range 59, and a designated corresponding single beam photodiode 57 for sensing the condition of a cell 43 within the designated cell range 59. As can be seen from FIGS. 3 and 3a, the array of photoemitters 51 and the array 55 of photodiodes 57 are angularly positioned on opposite sides of the encoder pad 23 such that each single beam 61 travels along a path from the single beam emitter 53 preferably through the radial midpoint 49 of a designated cell range 59 to its corresponding designated single beam photodiode 57. As further shown in FIGS. 3 and 3a, each of the cells 43 that forms an encoder array 37 either allows the passage of light, or blocks the passage of light so as to make each encoder array 37 contained within the encoder pad 23 uniquely identifiable. In operation, each of the single beam photoemitters 53 contained in the array of photoemitters 51 may be energized so as to emit a single beam 61 directed along a path beginning at each photoemitter 51 passing through the photoemitter's designated cell range 59 at its radial midpoint 49, and ending at the single beam photoemitter's 53 corresponding designated photodiode 57 contained within the array 55 of photodiodes 57. The single beam 61, preferably, may be blocked or allowed to pass through the designated cell range 59 based on the position of the encoder pad 23 and the cell aligned with the beam 61. Preferably, this may be achieved by providing cells 43 which are transparent or opaque, or alternately by slotting or placing apertures in the cell position in which the passing beam 61 may be partially, but not entirely blocked. Each of the single beam photodiodes 57 within the array 55 of photodiodes 57 is energized so as to control the flow of current through the single beam photodiode 57 in response to sensing the single beam 61. The array 55 of photodiodes 57 outputs gauge signals corresponding to the cell 43 within the designated cell range 59 at the position of the encoder pad 23 aligned with the arrays.

For illustration purposes, FIGS. 2 and 3a show a five bit encoder pad. The optical sensor 25 outputs a binary-coded decimal (BCD) or four bit word gauge signal. Preferably, the conditions of the cells 43 (e.g. transparent or opaque) are arranged to produce four bit binary code or BCD code. Depending on the condition of the cell 43, each photodiode 57 circuit will output voltage corresponding to a binary 1 or 0. Thus, a different four bit word or BCD code is generated for each encoder array 37. For example, with a four bit configuration, sixteen unique points of resolution are readable (0000-1111). With a five bit configuration, thirty-two unique points of resolution are readable. For example, if a different level of resolution is required (i.e. more or less), the optical rotary position encoder 21 may be configured with more or less photoemitters 51, photodiodes 57, cells 43, and encoder arrays 37, outputting a larger or smaller bit word.

Figure 4:
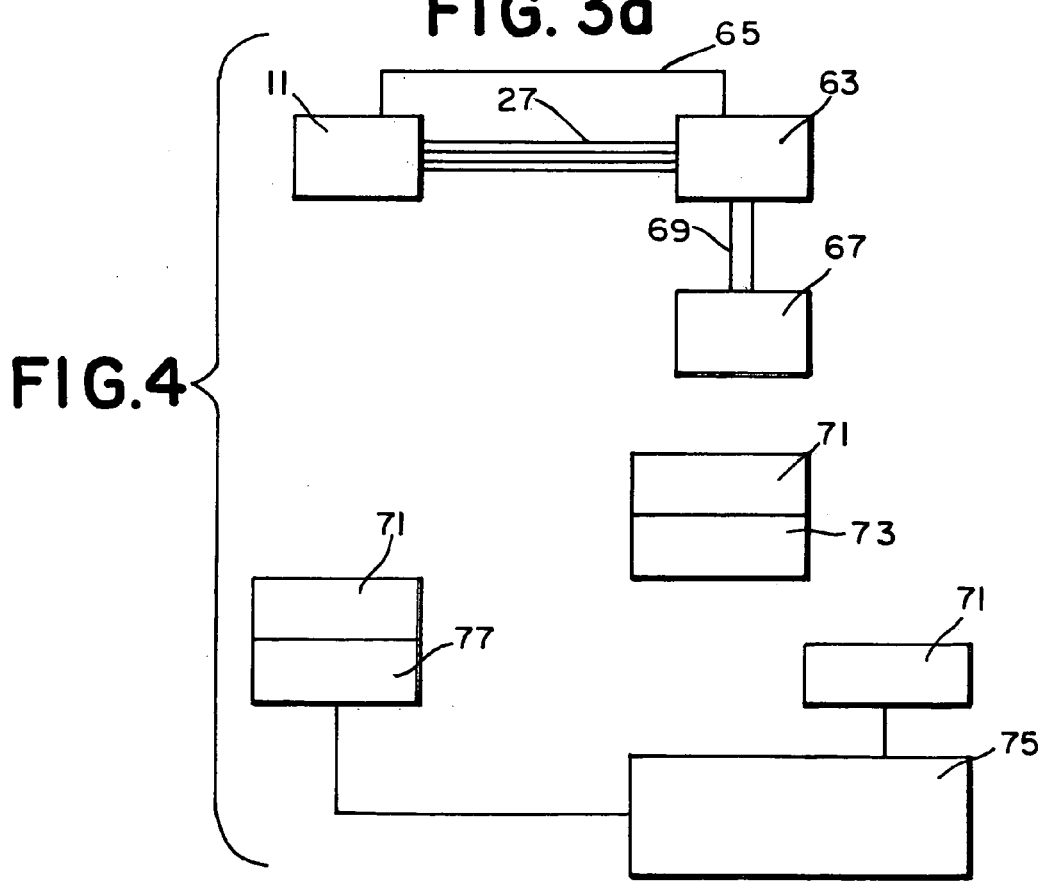
FIG. 4 is a schematic illustration of the communications functions of the gauge.

FIG. 4 illustrates the communications functions of the gauge 11. The gauge 11 provides a gauge signal 27 based on the output of the photoemitters 51 and beams 61 detected by the photodiodes 55. The gauge signal 27 is sensed by a microcontroller or sequencer 63. The microcontroller or sequencer 63 receives and interprets the gauge signals 27, generates command signals 65 for powering the optical sensor 25 or powering or driving the first transmitter or transceiver 67 and for generating at least one more of the transmitted sense signals 69 for transmission by the first transmitter or transceiver 67. The first transmitter or transceiver 67, being driven by the microcontroller or sequencer 63 communicates with a remote transmitter or transceiver 71, and either conveys the transmitted sense signal 69 to the remote transmitter or transceiver 71 or receives a request for the microcontroller or sequencer 63 to monitor the gauge signal 27 and convey it by a translated sense signal 69. The remote transmitter or transceiver 71 can be coupled with a wireless network 73, a wired network 77, or a combination thereof 76 to ultimately communicate with the user interface 75. The remote transmitter or transceiver 71 can also be coupled with a wired network 77 such as a wire telephone network to achieve ultimate communication with the user interface 75. Alternatively, the remote transmitter/transceiver 71 can be directly wired with the user interface 75 so as to complete the communication link. Dual tone multi frequency (DTMF) method of communication may be used to convey the information to the user interface 75.

At its simplest form, the user interface 75 functions to interpret the transmitted sense signal 69 and generate an output conveying the tank identification and tank liquid level 17.

The gauge 11 may incorporate additional sensing and control functions, such as, for example, sensing temperature, a fuel leak, presence of fuel in the air and/or operating a shut off valve along the way from the tank to the regulator.

As previously stated, a fuel distributor would typically send out refueling trucks on a predetermined route to manually monitor the liquid level in the tanks by driving to each tank location and viewing the liquid level via a visible gauge attached to the tank. This method becomes more inefficient as the service area of the distributor grows. Distributors have also used software programs that would estimate the level in a fuel tank based on climate conditions, historical fuel consumption data, and other factors. The present invention improves the inefficiencies that exist in the current state of the art by providing the distributor with near real time conditions of the tank levels throughout the geographic area served by the distributor.

For example, the present invention is used in connection with a number of tanks located at different points within a distributor's service area. The gauge adapted to operate with the conventional float mechanism on new or existing fuel tanks and configured to communicate with the user interface or computer centrally located at the fuel distributor's delivery terminal. The gauge is also given a unique identification that is known by the user interface or computer and associated with a physical location.

In accordance with a preferred embodiment of the invention, the gauges are configured to sense the liquid level at regular intervals, for example, every minute. When the liquid level is sensed below a critical level (33 percent for example) the control circuit powers the transceiver (a wireless phone for example) establishes a communication link (dials the number designated for the centrally located computer for example) and transmits the unique identification followed by the tank level (the transmission achieved by dual tone multi-frequency (DTMF) for example). Other communication methods can be used. For example, the tank information can be conveyed by FM, a digital email message, or via satellite communication.

The centrally located computer configured to receive the information sent from the gauge and programmed with software that correlates the information received with the geographical location of the tank, groups the information, and then stores the grouped information. Many of the steps can also be performed manually, without the computer and software. For example, the gauge transmission may be transmitted to another wireless phone that is coupled with a DTMF decoder that outputs the tank information onto a paper tape located within a delivery truck. The remaining steps mentioned above can be performed by the delivery truck driver using a log book for example.

Once the gauge information is received, correlated, grouped, and stored, the grouped information can then be sorted and/or filtered according to tank level and/or tank location, and a delivery route may be plotted that maximizes the amount of fuel deliveries per route. An efficient route is then identified using this near real time information. These steps can also be achieved either manually or through the computer programmed with the appropriate software. As further example, the software may be coupled with spatial information such as Global Information System (GIS)/Global Positioning System (GPS) information to further streamline the routing process.

In accordance with another preferred embodiment, the distributor may ping some or all the gauges in the service area to ascertain the tank levels. In response to the request from the user interface or computer, the gauge may sense the tank level and transmit the identification information and the tank level back to the user interface or computer wherein some or all of the correlating, grouping, storing, sorting or filtering steps are completed. The delivery routes are then identified or planned according to the refueling needs of the tanks. Under this method, the tanks with critical needs can be replenished as well as other tanks along the route with less critical fuel levels.

The invention claimed is:

1. A method of improving logistical efficiencies associated with the delivery of Liquified Petroleum Gas (LPG) or fuel oil to a number of remotely dispersed tanks over a geographic area comprising:
    sensing the liquid level in at least one tank;
    transmitting at least one signal conveying a tank identifying indicia and a liquid level relating to the identified tank;
    receiving at least one signal conveying the tank identifying indicia and the liquid level relating to the identified tank;
    correlating the tank identifying indicia and the liquid level relating to the identified tank with a geographical location for the tank;
    grouping the tank identifying indicia and the liquid level relating to the identified tank with the geographical location for the tank in a unique data array;
    storing the unique data array in a database containing a plurality of data arrays;
    sorting and/or filtering the data arrays within the database by liquid level and/or geographical location to create a sorted and/or filtered database;
    identifying at least one delivery route through a region that encompasses at least one of the geographical locations present in the filtered database; and
    plotting the at least one delivery route.

* * * * *